D. P. & W. F. Leach,
Portable Stall.

No. 111,653.    Patented Feb. 7, 1871.

Witnesses.
Harry King
G. L. Curtis

Inventor.
Daniel P. Leach
William F. Leach
per Alexander Mason
Attys.

United States Patent Office.

DANIEL P. LEACH AND WILLIAM F. LEACH, OF FRANKLIN, INDIANA.

Letters Patent No. 111,653, dated February 7, 1871.

IMPROVEMENT IN PORTABLE STALLS.

The Schedule referred to in these Letters Patent and making part of the same.

*To all whom it may concern:*

Be it known that we, DANIEL P. LEACH and WILLIAM F. LEACH, of Franklin, in the county of Johnson and in the State of Indiana, have invented certain new and useful Improvements in Combined Portable Stall, Pen, and Fencing; and do hereby declare that the following is a full, clear, and exact description thereof, reference being had to the accompanying drawing and to the letters of reference marked thereon making a part of this specification.

The nature of our invention consists in the construction and arrangement of a "combined portable stall, pen, and fence," as will be hereinafter fully set forth.

In order to enable others skilled in the art to which our invention appertains to make and use the same, we will now proceed to describe its construction and operation, referring to the annexed drawing, in which—

Figure 1:
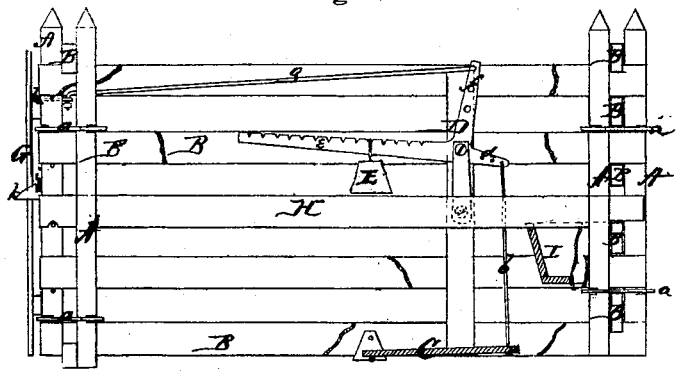
Figure 1 is a side elevation of our stall or pen.
Figure 2:
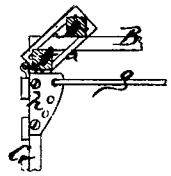
Figure 2 is a plan view of the corner in which the gate is hung.
Figure 3:
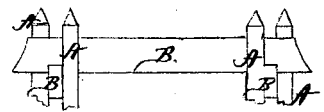
Figure 3 is a front view of the top of the pen.
Figure 4:
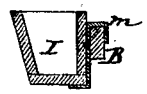
Figure 4 is a vertical cross-section of the feed-trough.

A A represent the posts, which can be made of either round or square lumber, and placed both on the outside, or one on the outside and one on the inside of the pen.

The posts A A are connected together by means of clips or rings $a$ $a$, of any suitable material, said clips or rings forming clamps or fastenings, in which the corners are braced, as shown in the drawing.

The side and rear planks B B are then inserted between said posts, as shown in fig. 1; and by notching the bottom and top planks, or any desired plank, and fitting them together at the corners, they will prevent the corners from slipping.

The treadle C may be hinged to the bottom, or pivoted in the sides, as shown in fig. 1, as may be desired.

The rope or rod $b$, that connects the treadle C to one arm, $d$, of the T-shaped lever D, can be changed at will to suit by the holes in said arm.

The arm $e$ of said lever, extending in the opposite direction from the arm $d$, is provided with a series of notches in its upper edge, in which the weight E may be adjusted to suit any weights that are to come on the treadle.

The upper arm $f$ of the lever D is, by a rod, $g$, connected with a plate, $h$, on the door or gate G, which is hinged in any suitable manner.

The rod $g$ may be adjusted at both ends by means of holes in the arm $f$ and plate $h$.

By this arrangement any animal entering the stall or pen and tramping on the treadle C, closes the door or gate.

The stall thus constructed is portable, and can be used for milking.

By laying a drop-bar, H, as shown in fig. 1, down on the right side of the stall, it will admit the calf to suck and persons to milk without any trouble, and by laying the bar up, it separates the cow and the calf.

Upon the outer edge of the gate G is pivoted a bar, $i$, and on the post A adjoining is pivoted a latch, $k$, which can be let down, so that any animal entering the stall and shutting the door will lock itself in.

By throwing the latch $k$ back, it will prevent the door from locking.

The feed-trough I is on the rear side provided with hooks $m$ $m$, so that it can readily be attached to any one of the horizontal bars B of the stall.

It will be observed that the lumber used in this stall or pen is not damaged by nailing; and it does not rot as bad, and can be torn down and moved without any damage, or the lumber can be used for other purposes.

Having thus fully described our invention,

What we claim as new, and desire to secure by Letters Patent, is—

The combination and arrangement of the posts A A, planks B B, clamps $a$ $a$, treadle C, lever D, with weight E, door G, drop-bar H, and feed-trough I, all substantially as and for the purposes herein set forth.

In testimony that we claim the foregoing we have hereunto set our hands this 26th day of February, 1870.

D. P. LEACH.
W. F. LEACH.

Witnesses:
C. L. EVERT,
J. E. HUTCHINSON.